Sept. 15, 1959 B. COX ET AL 2,904,777

MAGNETIC TAPE READING SYSTEM

Filed Nov. 5, 1956 2 Sheets-Sheet 1

BONNAR COX
JACOB GOLDBERG
INVENTORS

BY Lyon & Lyon

ATTORNEYS

Sept. 15, 1959 B. COX ET AL 2,904,777

MAGNETIC TAPE READING SYSTEM

Filed Nov. 5, 1956 2 Sheets-Sheet 2

BONNAR COX
JACOB GOLDBERG
INVENTORS

BY Lyon & Lyon

ATTORNEYS

United States Patent Office 2,904,777

Patented Sept. 15, 1959

2,904,777

MAGNETIC TAPE READING SYSTEM

Bonnar Cox and Jacob Goldberg, Palo Alto, Calif., assignors, by mesne assignments, to General Electric Company, New York, N.Y., a corporation of New York Application November 5, 1956, Serial No. 620,410

3 Claims. (Cl. 340—174)

This application relates to magnetic tape reading systems and, more particularly, to an improved method and means for reading the contents of magnetic tape into subsequent apparatus which operates on these contents.

One of the purposes served by magnetic tapes in information-handling machines is that of providing a memory for data being handled by such machine. In the course of operating an information-handling machine, it becomes necessary to read the data from the magnetic tape for the purpose of either utilizing it within the machine or for the purpose of printing it out. One of the problems presented, when it is desired to read the contents of magnetic tape into other apparatus, is that usually the ability of such other apparatus to absorb and process the data being read thereinto is a limited one. The speed of operation of the apparatus receiving the information from the tape may be quite different from the speed required for readout from the tape. In either case, it is apparent that some sort of intermediate storage is necessary which can receive the contents of the tape as fast as the tape is being run. This intermediate storage is known as a register, or buffer storage, and has a limited capacity. The tape is usually run until the buffer storage is filled. Then the tape is stopped, the contents of the buffer storage are emptied into whatever apparatus is to utilize these contents. Then the tape is started again and the process is repeated.

Since the size of these buffer stores is fixed the system is rather inflexible in that the same size buffer store has its output connected to different types of apparatus whose capacity of data intake and whose speed of operation is quite variable. It will be appreciated that this is an uneconomical system, since where apparatus having small intake or low speed is involved, a small register is required and the expense of the large register is not necessary. However, due to the fact that present-day tape apparatus is usually geared to the type of buffer storage with which it is to co-operate, the system is inflexible.

An object of the present invention is the provision of a novel tape-reading method and means which is suitable for use with apparatus having different intake capacities.

Another object of the present invention is the provision of a novel tape-reading method and means which is more flexible than presently known systems.

Yet another object of the present invention is the provision of a novel and useful tape-reading system.

Still another object of the present invention is the provision of a novel tape-reading system where the amount of data read from the tape may be varied in accordance with the requirements of the apparatus into which such data is being read.

These and other objects of the invention are achieved by providing a tape-reading system wherein the logic which is included in this system receives an indication from the apparatus into which the data from the tape is being read when such apparatus is filled. In a special track which is adjacent the data tracks, a magnetic mark is placed on the tape indicative of the location at which the readout was terminated. An erasing operation then occurs in the marker track until the tape coasts to a stop. The tape is then reversed until it has passed the position of the magnetic mark. Due to the inertia of the tape mechanism, it will coast for a distance even after a stop command. Advantage of this fact is taken so that when the stop command is initiated upon passing the magnetic marking, an erasing operation is permitted in the magnetic marking track, to erase a previous magnetic marking. Upon receiving a signal that the apparatus is now ready for additional data, the tape is run forward and reading therefrom is permitted only upon the magnetic marking just made being sensed. Again, when the apparatus receiving the data indicates that it is filled, a magnetic marking is placed upon the special track for that purpose and the tape is stopped. It is then permitted to reverse past the newest magnetic marking, at which time a stop command is issued and the old magnetic marking is erased. The distance that the tape is permitted to run forward is determined solely by the ability of the apparatus with which it is to be used to absorb the data being read from the tape. The processing time of such data by the apparatus is utilized for the purpose of returning the tape to a position before the position at which the data readout was terminated. In this manner, operation time is reduced.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

In order to explain the principles of this invention clearly and simply, the invention will be described in combination with an output printer. This should not be considered as a limitation upon the spirit and scope of the invention, since as it will become apparent from the description herein, the tape-reading method and means may be employed with any types of apparatus into which it is desired to read the data contained on the magnetic tape. All that is required of that apparatus is that it provide a first signal indicative of the fact that it requires no further data and a second signal indicative of the fact that further data is required.

Figure 1:
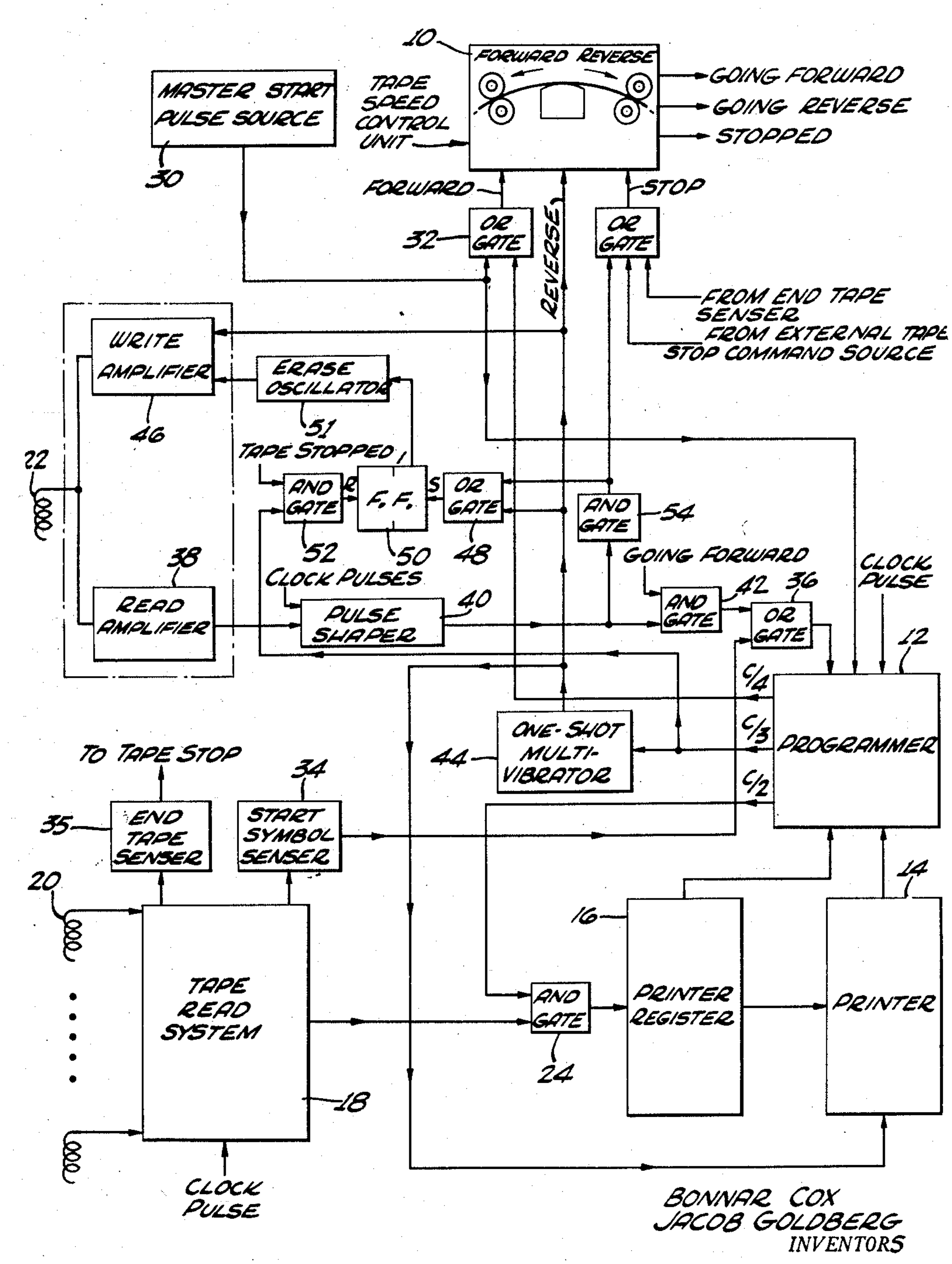
Figure 1 is a black diagram of an embodiment of the invention.

In order to utilize the method and means of this invention, it is necessary to allot on the magnetic tape space for a special track which is to be used for the magnetic marking of the locations where the readout of data has terminated. This track may be adjacent the tracks containing the data being read. There must further be provided a typical read-write magnetic transducer head over this special marker track. Referring now to Figure 1, there may be seen a block diagram of this invention. For the purpose of enabling the tape apparatus to run forward, to run backward, and to stop where necessary, a unit which is designated as the tape-speed-control unit 10 is indicated. This includes apparatus for controlling both the direction of motion and stopping of the tape transports and providing outputs indicative of the direction of motion or the fact that the tape is stopped. Such tape-transport-control apparatus is well known in the information-handling machine field. A preferred novel tape-speed-control system is described and claimed in an application by these inventors which is entitled Control Apparatus, filed July 20, 1956, Serial No. 599,089, now Patent No. 2,867,791.

A programmer 12 serves the function of sequencing the occurrence of operations. It comprises a counter of the type to be shown in more detail in Figure 2. The output indicative of its counting condition is represented by $c/2$ or $c/3$, indicating that it is in a second or a third count condition, respectively. For the purposes of explaining this invention, let it be assumed that it is desired to print out the contents of the tape employing a mechanical output printer. This printer 14 may be one of the types presently being sold commercially and referred to as a "Shephard Printer," which has a drum carrying thereon columns of type. A printing position is established at one point along the drum. At this printing position, an inked ribbon slowly passes adjacent the drum. In proximity to the inked ribbon, the paper on which the printing is to occur is passed. The drum rotates at high speed so that all the type will be moved past the printing position before the paper has had time to move very much. Means are provided for indicating to associated apparatus which type characters are at the printing position and if this character is one of those desired to be printed, hammers are actuated to push the paper against the inked ribbon, whereby the printing is performed.

These high-speed output printers normally have associated therewith a register into which data is inserted. Then, as the printer rotates, this data is compared with the information being supplied from the printing drum. In Figure 1, the printer is represented by the rectangle 14 and the printer register is represented by the rectangle 16. Means are provided to sense when the printer register is filled and to supply a first signal indicative thereof to the programmer. Such means may be a sensing gate on the last stage of the register to detect when data is entered therein, or a counter which when it has counted the number of digits read from tape which are required to fill the register provides an output signal indicative thereof. Means are also provided for indicating when the contents of the printer register have been printed and to supply a second output signal indicative thereof. This may be a means for sensing when the register is empty, a counter which counts the number of digits which are printed and signals when the requisite number is reached, or the same counter as is used to count the input to the register may be made a reversible counter and it counts backwards to zero as the register empties.

The reading system for the tape is represented by the rectangle labeled tape-read system 18. Tape-reading systems are well known and need not be redescribed here. The output of the tape-reading system is synchronized from a suitable clock-pulse source. For each track of the tape, there is provided a separate magnetic transducer head 20. The heads over the data tracks are designated as the data-read heads. The head 22 over the marker track will be designated as a marker head. The output of the tape-read system, as previously indicated, is applied to the printer register through an And gate 24. The And gate is only open in the presence of a read-command signal from the programmer 12. Otherwise, it does not permit data from the tape-read system to be applied to the printer register.

The operation of the invention will now be described. Assume it is desired to commence the print-out of date which is recorded on the magnetic tape. To do this, an initiating signal, which may be designated as the master start signal, is provided. This may come from the information-handling system with which the apparatus being described may be associated, or may be manually generated by closing a switch to discharge a condenser. Thus, a master start signal source 30 provides the required signal. This is applied to the programmer 12 and also to an Or gate 32. The Or gate 32 applies the master start signal to the tape-speed-control apparatus to order it to start the tape running forward.

In the event no marker pulse was placed on the track from a previous readout operation, or was specifically placed there for the purpose of indicating the point from which a readout is to occur, in the data tracks there may me recorded what may be designated as a start symbol. This is merely a code pattern which may be detected by the start-symbol senser 34. Symbol sensers are well known in the art, a suitable one being described in Patent No. 2,648,829 to Ayres and Smith, designated as Code Recognition System. In the event that the start-symbol senser recognizes a start symbol, its output is applied to an Or gate 36, the output of which is applied to the programmer 12 to energize it to provide a read-command signal to the And gate 24. In the event that a marker pulse had been previously recorded in the marker track, the output of the marker pulse head 22 is applied to a read amplifier 38, the output from which is applied to suitable pulse-shaping-and-timing network 40. This is well-known circuitry, such as a flip-flop or Schmitt trigger circuit. The output of the pulse-shaping-and-timing network is a pulse which is applied to an And gate 42. The other required input to open And gate 42 is an output from the tape-speed-control unit which is indicative of the fact that the tape is going forward. The output of the And gate 42 is applied to the Or gate 36, thus resulting in instructing the programmer to provide an output which is a "read-command" signal.

With the tape going forward and being read, the data therefrom is entered into the printer register 16. When the printer register fills, it provides an output signal indicative of that fact to the programmer. This advances the programmer 12 and instructs it to provide a "register-full" pulse as an output. The "register-full" pulse is applied to a one-shot multivibrator 44. The output of the one-shot multivibrator is applied to the tape-speed control to instruct it to begin the reversing operation of the tape. It will be understood that before the tape can be reversed, it must first be brought to a stop. The function of the tape-speed-control apparatus is to first bring the tape to a stop and then reverse it in response to a command to reverse the tape, which occurs at the time the tape is going forward. The output of the one-shot multivibrator 44 is also applied to the writing amplifier 46, which, in turn, causes the magnetic marker head 22 to write a pulse in the marker track. This pulse occurs at the location on the track which is adjacent to the location on the data track at which readout was terminated.

It should be noted that when the "register-filled" signal occurs, the programmer 12 advances and thus no longer provides as output a "read command" signal. The output of the one-shot multivibrator 44 is also applied through an Or gate 48 to a flip-flop circuit 50 to drive the flip-flop circuit 50 to its set condition. The output of the flip-flop circuit 50, when in its set condition, is applied to an erase oscillator 52, which turns the oscillator on. The output of the erase oscillator is applied to the write amplifier 46, whereby the magnetic marker head is instructed to commence erasing. Thus, the marker track is cleaned up in advance of the marker pulse which has just been written. The output of the one-shot multivibrator 44 is also applied to the printer apparatus 14, to instruct it to start printing the data in its register. This signal may not be required if the printer apparatus itself can sense when its register has data available for printing. Thus, to summarize the above, when the printer register provides an output signal indicative of the fact that it is filled, the programmer receives this signal, cuts off the read-command signal, provides a signal to the marker track magnetic head 22, instructing it to write a pulse to locate the position at which data is no longer read and also instructs it to start erasing after the marker pulse is written. Delay time to allow the marker pulse to be written before the erase oscillator is energized is provided by the flip-flop circuit 50. The marker track is cleaned up in advance to make sure that when the tape advances again there is nothing on the track to cause erroneous operation. The programmer also orders the tape-speed-control apparatus to commence the function of reversing the direction of the tape motion. Further, the printer is instructed to commence the printout of the data now in the printer register.

After the tape has been stopped, the flip-flop 50 is reset by a signal received from an And gate 52. The input to this And gate 52 consists of an instruction *c*/3 from the programmer, as well as an output signal from the tape-speed-control unit 10 indicative of the fact that the tape is stopped. The tape is then reversed in direction by operation of the tape-speed-control unit. The erase oscillator has been turned off, and thus when the tape is going in the reverse direction the marker pulse in the marker track is not erased. In going backwards, the marker reading head will read the marker pulse which has just been written. This signal will not pass through the And gate 42, since the other required signal is not present. However, the output of the pulse shaper 40 is also applied to an And gate 54, which receives as its other required input an output from the tape-speed-control unit indicative of the fact that the tape is going in the reverse direction. The output of the And gate 54 is applied to the tape-speed-control unit as a stop command. The output of the And gate 54 is also applied to the flip-flop 50 through the Or gate 48 for the purpose of driving it to its set condition and turning on the erase oscillator.

The tape transport appartaus does not come to an instantaneous stop, as previously indicated. It coasts to a stop and therefore requires a period of time for this to occur. The extent of this coasting varies. It is usually on the order of milliseconds. Advantage of this fact is taken here, since as the tape is coasting to a stop, it will pass by the position of any previous marker pulse. Since the erase oscillator is turned on, the previous marker pulse is erased. When the tape stops, a signal indicative of that fact is applied by the tape-speed-control unit to the And gate 52, whereby the flip-flop 50 is reset and the erase oscillator 51 is turned off.

The tape is now in position to commence running forward again, to provide additional data for the printer register. However, it cannot do this until an end-print signal is received from the printer 14, indicative of the fact that the contents of the printer register has been printed out. The time required for the previously described operations of the tape is not wasted, since the printer requires a certain amount of time to print out the information being supplied thereto. When the end-print signal is received by the programmer 12, it provides as its output a signal which is applied to the Or gate 32 and instructs the tape-speed-control unit 10 to start the tape running forward. When the tape starts running forward, no data will be read into the printer register until after the marker pulse has been read on the marker track. When this occurs, an output from the And gate 42 is applied to the Or gate 36, and the programmer is again instructed to provide a "read command" signal to the And gate 24. This enables the data to be read into the printer register in the manner described previously.

It should now be apparent that the apparatus described performs the function of marking the tape at the location where data was last read, which also indicates the location at which data should commence to be read for the next operation. The system also provides for the erasure of old-marker pulses after a new-marker pulse is laid down. The system inherently also has the virtue that reading does not commence unless the tape is up to the speed at which a suitable reading can occur. If the tape does not reach the speed at which a suitable reading can occur, then no marker pulse is read. It is preferred not to read anything unless the data being read is correct. It should now also be apparent that the amount of data which can be read can vary with the size of the buffer store. The system is sufficiently flexible to be suitable for use with any size apparatus. If the amount of data read is larger in the space that it occupies on the tape than is required for the tape to coast to a stop, then provision may be made for delaying the stopping operation until it is sure that the old-marker pulse is erased. This can be done simply by the insertion of suitable delay apparatus in the tape-speed-control unit. This may be switched into use when the apparatus requiring large amounts of data is connected to the tape readout apparatus.

The only requirement for apparatus with which this invention is to be used is the furnishing of a signal indicative of the fact that the apparatus has sufficient data and a second signal to indicate that that apparatus has completed its operation on the data readout of the tape. To stop the operation of the invention at the end of the tape, a symbol may be placed on the tape indicative of that fact which is sensed by the end-of-tape symbol senser 35. Its output is applied to the tape-transport mechanism to order it to stop. Alternatively, a stop signal may be applied from any suitable source, including a symbol on the tape and readout by a symbol senser.

Figure 2:
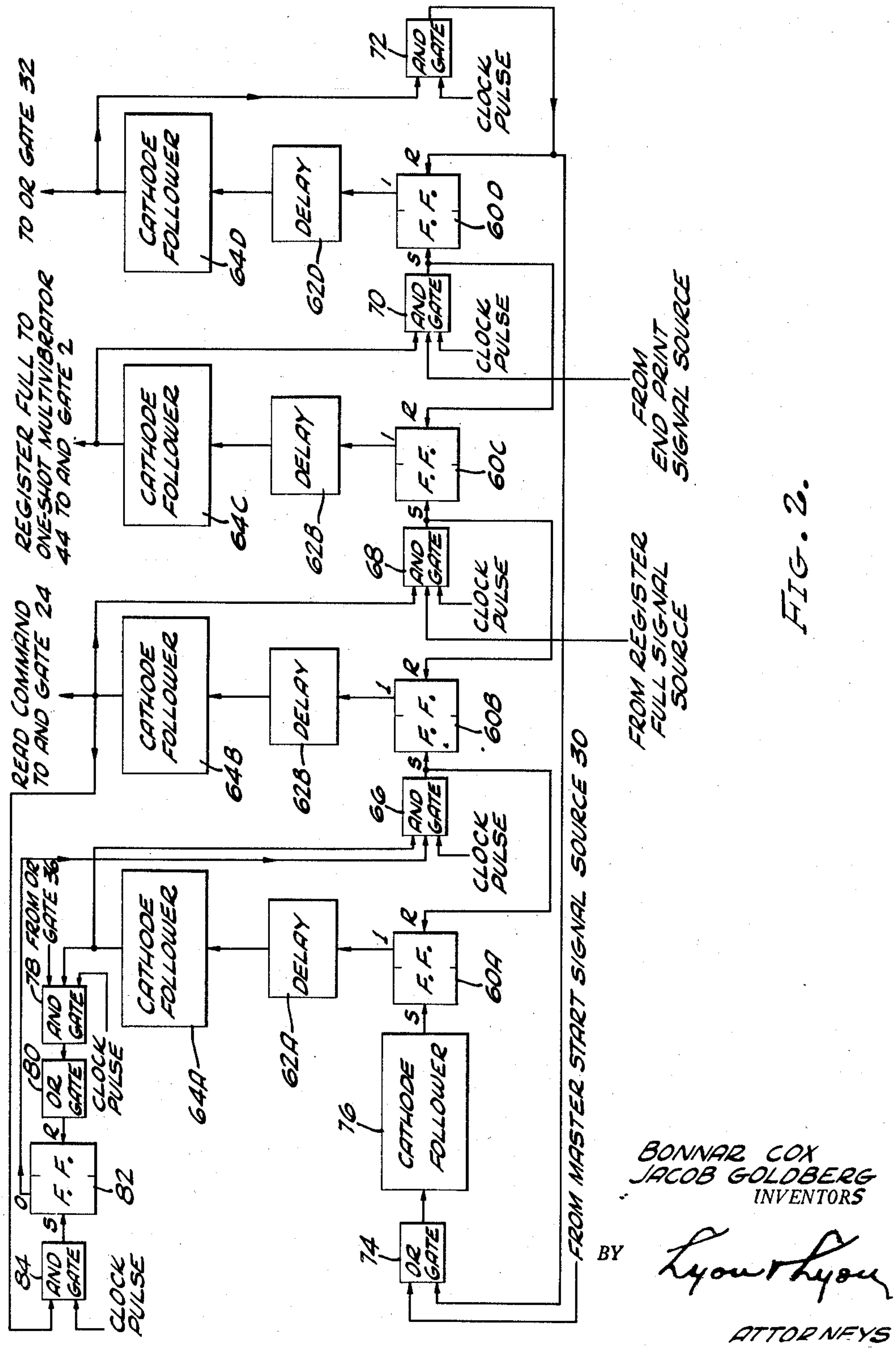
Figure 2 is a block diagram of a programmer suitable for use in the embodiment of the invention.

Figure 2 is a block diagram of the circuitry suitable for use as a programmer 12. As will be seen from the following description, this actually comprises a ring counter which is modified to function for the purpose of providing programming instructions. It includes a ring counter of the type which has been described and claimed in an application for a Gated-Delay Counter, by James E. Heywood, Serial No. 400,645, filed December 28, 1953, and assigned to a common assignee. This includes four flip-flop circuits 60A, 60B, 60C, and 60D. Each one of these flip-flop circuits has output derived from the "one" side. The output is applied to respective delay circuits 62A, 62B, 62C, and 62D. The outputs from the respective delay circuits are applied to cathode-follower circuits 64A, 64B, 64C, 64D. Between the flip-flop circuits 60A and 60B, there is interposed an And gate 66. This And gate, when it is enabled, serves the function of resetting the previous flip-flop circuit 60A and setting the succeeding flip-flop circuit 60B. Similarly, an And gate 68, when enabled, resets flip-flop circuit 60B and sets flip-flop circuit 60C, and an And gate 70 serves the function of resetting flip-flop circuit 60C when enabled and setting flip-flop circuit 60D. And gate 72 serves the function of resetting the flip-flop 60D and setting flip-flop 60A, thus completing the ring.

In operation, a signal from the master start signal source is applied to an Or gate 74. The output of this Or gate is applied to a cathode-follower 76, to set the flip-flop stage 60A, if it is not already set. When set, the one side of the flip-flop circuit applies an output to the delay circuit 62A, the output of which is applied to the cathode follower 64A. It should be noted that the purpose of the delay circuit in the counter is to stretch slightly the output of the flip-flop circuit; otherwise, they occur too fast and do not properly operate the succeeding circuitry. The cathode-follower output is applied to the And gate 66 and also to an And gate 78. This And gate 78 also requires as its other two inputs an output from Or gate 36, shown in Figure 1, as well as a clock pulse. Clock pulses are derived from a clock-pulse source, or a source of synchronizing signals. These may be provided by an oscillator, or pulses on a magnetic drum, which is a part of the information-handling machine with which this system may be employed. The utilization of clock pulses is well known to those versed in the field in which this invention falls. The output of the And gate 78 is applied to an Or gate 80. The Or gate 80 also has applied thereto the master start signal pulse. The output of Or gate 80 is applied to a flip-flop 82. This flip-flop is reset by the Or gate 80 output. The output of flip-flop 82 serves as the second required input to And gate 66. The third required input is the clock, or synchronizing, pulse. The output of And gate 66 is applied to reset the flip-flop stage 60A and to set the flip-flop stage 60B.

At this point it should be noted that flip-flop stage 60A is set either as a result of an input received from the last stage 60D of the counter or as a result of the input received from the master start signal source. The master start signal source pulse merely insures that the counter is in condition to commence operation in response to the output received from the Or gate 36. The function of flip-flop 82 is to insure that after each cycle of operation the counter will rest with the flip-flop circuit 60A in its set condition. The will be no further advance of the counter beyond this condition until the marker pulse and going-forward signals are received.

Now with flip-flop 60B in its set condition, its output is applied from the cathode follower 64B through And gate 84 to reset flip-flop 82. The output of the cathode follower 64B is also applied to And gate 68 and further is applied as a read command to And gate 24 in Figure 1. The counter remains in this state until a signal is received from the register of the printer, indicating that the register is filled. This, together with a clock pulse, enables And gate 68, so that flip-flop 60B is reset, thus terminating the read command, and flip-flop 60C is set. The output of flip-flop 60C is taken from cathode follower 64C and applied to the one-shot multivibrator 44 to indicate that the register is filled. This output is also applied to And gate 52, shown in Figure 1, so that when the magnetic tape has stopped, the erase oscillator will be turned off. The output of cathode follower 64C is also applied to And gate 70. The counter will then remain in this condition until such time as the printer has finished processing the data which is held in its register. At this time, an end-of-typing signal is received, indicative of the fact that the register is ready for further information. This signal enables And gate 70 to set flip-flop circuit 60D and reset flip-flop circuit 60C. As a result, a signal is applied to the Or gate 32 in Figure 1 to instruct the tape-speed-control unit to start the tape running forward. Also, And gate 72 is primed so that upon the occurrence of the next clock pulse an input is applied to Or gate 74, whereby the counter is reset to its standby condition.

Tape-reading and tape-writing systems which are represented by rectangles in Figure 1 are well known in the art, and a detailed showing thereof is not deemed required here. Systems for controlling the direction of the tape in response to the application of signals are also well known in the art. As previously noted, a preferred system is that described and claimed in an application by these inventors, which is entitled Control Apparatus. In this system, flip-flop circuits are provided which are set as a result of the input command to store such input command until the command is executed. These flip-flop circuits energize counters, the outputs from which determine when tape is going in one direction how long after a command is received to go in the other direction a stop command and then a command to go in the direction ordered should issue. Flip-flop and gate circuits are well known. Suitable flip-flop circuits are shown, for example, in a text Electronics, on page 96 et seq., published by the McGraw-Hill Book Company in 1949, the authors being Elmore and Sands. Suitable And gates, Or gates corresponding to coincidence circuits, and buffer circuits are also shown in this text.

There has accordingly been described and shown herein a novel, useful, and simple method and apparatus for reading data from tape into other apparatus which is to perform operations on such data. As previously pointed out, the output printer is employed as an illustration of the utility of the invention. This is not to be construed as a limitation. This method of readout of information on tape may be employed in conjunction with other types of apparatus as well as in information-handling systems wherein the magnetic memory must supply data to different capacity apparatuses within the information-handling machine.

We claim.

1. A system for reading data from magnetic tape into apparatus which provides a first signal indicative of the fact that it has sufficient data and a second signal indicative of the fact that it requires more data, said system comprising means to magnetically mark said tape responsive to a first signal at a location indicative of where data read out is terminated, means to order said tape to stop and then reverse its motion responsive to said first signal, means to read said magnetic mark and to provide an output indicative thereof, means responsive to output from said means to read said magnetic mark when said tape is moving in reverse to apply an erasing signal to said tape to erase any previous magnetic marks, means responsive to output from said means to read said magnetic mark when said tape is moving in reverse to order said tape to stop, means responsive to a second signal to order said tape to move forward, and means responsive to output from said means to read said magnetic mark when said tape is moving forward to permit further readout of data from said data from the location indicated by said mark.

2. A system for reading data recorded on tracks on magnetic tape into apparatus which provides a first signal indicative of the fact that it has sufficient data and a second signal indicative of the fact that it requires more data, said system comprising a marking magnetic transducer head positioned over said tape adjacent to said data tracks, means to initiate readout of data into said apparatus, means responsive to a first signal to prevent further readout of data from said tape, means responsive to said first signal to apply a pulse to said marking head to mark said tape at the location of the termination of data readout, means responsive to said first signal to order said tape motion stopped and then reversed, means responsive to said marking transducer head reading said mark when said tape motion is reversed to apply an erasing signal to said marking transducer head, means responsive to said marking transducer head reading said mark when said tape motion is reversed to order said tape to stop, means responsive to a second signal to order forward motion of said tape, and means responsive to said marking transducer head reading said mark when said tape is moving forward to permit data readout to occur from the location from whence data readout was previously terminated.

3. A system for reading data recorded in tracks on magnetic tape into apparatus which provides a first signal indicative of the fact that it has sufficient data and a second signal indicative of the fact that it requires more data, said system comprising a marking magnetic transducer head positioned over said tape adjacent to said data tracks, a program counter having a plurality of count conditions, a first of these being a standby condition, means to advance said counter to a second count condition, means responsive to output from said counter when in its second count condition to permit readout of data from said tape into said apparatus, means responsive to a first signal to advance said counter to a third condition, means responsive to output from said counter in its third condition to apply a pulse to said marking head to mark said tape in said marking channel adjacent the location where data readout was terminated, means responsive to said counter third condition output to order said tape to stop and then reverse its motion, means responsive to said marking head reading said mark when said tape is going in reverse to apply erasing signals to said marking magnetic head, means responsive to said marking head reading said mark when said tape is going in reverse to order said tape to stop, means responsive to said tape stopping and said counter third condition output to terminate said erase signals, means responsive to a second signal to advance said counter to a fourth count condition, means responsive to counter output when in its fourth count condition to order said tape to move forward, means responsive to said counter being in its fourth condition to return it to its standby condition, and means responsive to said marking head reading said mark when said tape is moving forward to advance said counter to its second condition.

References Cited in the file of this patent

UNITED STATES PATENTS

| | | |
|---|---|---|
| 2,782,398 | West | Feb. 19, 1957 |
| 2,782,985 | Vibbard | Feb. 26, 1957 |